(12) United States Patent
Maldavs

(10) Patent No.: US 6,655,656 B2
(45) Date of Patent: Dec. 2, 2003

(54) QUICK DISCONNECT COUPLING

(75) Inventor: Ojars Maldavs, Lincoln, NE (US)

(73) Assignee: Parker Hannifan Corporation, Cleveland, OH (US)

( * ) Notice: Subject to any disclaimer, the term of this patent is extended or adjusted under 35 U.S.C. 154(b) by 170 days.

(21) Appl. No.: 10/045,615

(22) Filed: Nov. 9, 2001

(65) Prior Publication Data

US 2002/0106920 A1 Aug. 8, 2002

Related U.S. Application Data

(60) Provisional application No. 60/247,278, filed on Nov. 10, 2000.

(51) Int. Cl.[7] ................................................. F16L 29/00
(52) U.S. Cl. .............................. 251/149.6; 137/614.04; 137/614.03; 137/614
(58) Field of Search .................. 251/149.6; 137/614.04, 137/614.03, 614.05

(56) References Cited

U.S. PATENT DOCUMENTS

| | | | |
|---|---|---|---|
| 2,665,928 A | 1/1954 | Omon | |
| 3,052,261 A | 9/1962 | Nyberg | |
| 4,077,433 A | 3/1978 | Maldavs | |
| 4,150,691 A | * 4/1979 | Maldavs | ................ 137/614.03 |
| 4,350,321 A | 9/1982 | Berg | |
| 4,540,021 A | 9/1985 | Rogers | |
| 4,598,896 A | 7/1986 | Maldavs | |
| 5,191,914 A | * 3/1993 | Gonzalez | ................ 137/614.03 |
| 5,806,564 A | 9/1998 | Wilcox | |
| 5,884,897 A | 3/1999 | Arosio | |
| 5,937,899 A | * 8/1999 | Zeiber | ....................... 137/614 |
| 6,016,835 A | 1/2000 | Maldavs | |
| 6,145,539 A | * 11/2000 | Wilcox et al. | ......... 137/614.03 |

FOREIGN PATENT DOCUMENTS

| | | |
|---|---|---|
| DE | 7901/72 | 5/1972 |
| DE | 30 15 485 A1 | 4/1980 |
| GB | 57394/73 | 12/1973 |

* cited by examiner

*Primary Examiner*—Kevin Lee
(74) *Attorney, Agent, or Firm*—Renner, Otto, Boisselle & Sklar, LLP

(57) ABSTRACT

A quick disconnect female coupler comprises, inter alia, a wiper seal retained in a radially opening annular groove and including at its rear side an annular recess that allows rearward rolling of the wiper seal in the annular groove when the wiper seal is subjected to a surge of high pressure fluid from the main cavity to the back side of the piston, whereby the wiper seal moves out of the way of the high pressure fluid surge to avoid being forced out of the annular groove; a tubular spacer in the female housing bore the forms therewith an outer flow passage and which serves as a guide for an axially movable valve body, the spacer having an annular land and a rear end post press-fitted in the housing bore and a housing counterbore, respectively, for retaining and aligning the spacer in the housing; a poppet valve provided with orifices in an angled shoulder thereof for avoiding interference with flow previously caused by coil springs used to bias the poppet valve; and an annular protection shield which performs the dual functions of retaining a collar spring in a locking collar chamber and providing a barrier to entry of foreign material into the locking collar chamber.

21 Claims, 3 Drawing Sheets

QUICK DISCONNECT COUPLING

This application claims the benefit of U.S. Provisional Application No. 60/247,278 filed Nov. 10, 2000, which is hereby incorporated herein by reference in its entirety.

FIELD OF THE INVENTION

The invention relates to quick disconnect couplings and, more particularly, to a female quick disconnect coupler which provides for quick disconnect and preferably also quick connect.

BACKGROUND OF THE INVENTION

Quick disconnect couplings are used, for example, to connect hoses in hydraulic fluid lines. A typical application is on agricultural tractors to connect the tractor hydraulic system with attachable implements. The tractor typically includes one or more female coupler sockets, while the implements include one or more male coupler nipples. Pneumatic and other applications for such couplings are also well known.

Over the years changes have occurred in these systems which have required changes and performance improvements in the couplings. One early coupling design is shown in U.S. Pat. No. 4,077,433 where the female coupler includes a valve body slidable within the housing and a poppet valve internal to the valve body. The poppet valve is axially movable to engage a check valve in a male coupler when the male coupler is inserted into the female coupler. When low pressure is present in the male coupler, the poppet valve moves the check valve (ball valve) off its valve seat to allow flow from the female coupler to pass to the male coupler. When higher pressures are present in the male coupler, an internal passage in the poppet valve provides incoming fluid pressure to the rear surface of the poppet valve. Due to the differences in effective surface areas, the fluid pressure assists in driving the poppet valve against the check valve to move the check valve into an open position.

An improvement in this coupling is shown in U.S. Pat. No. 4,598,896, where a separate piston is located around the poppet valve. The piston can engage the poppet valve when moved forwardly. An internal passage in the poppet valve provides fluid pressure to the rear surface of the piston, which assists in driving the poppet valve against the check valve in the male coupler in high pressure situations. A spool is also provided around the piston and poppet valve in this coupling. The spool is fixed to the valve body and includes a port for exhausting pressure within the poppet valve. A retainer sleeve with a seal surrounds the port on the spool, and when the valve body slides within the housing (when the male coupler is inserted or removed), the port relieves the internal pressure in the female coupler to atmosphere.

In some cases, particularly when a pair of couplers are used to direct fluid to and from a hydraulic cylinder in an implement, a check valve mechanism is also provided in the female coupler to prevent the rapid backflow of pressure out of the female coupler when a pressure imbalance occurs within the system, such as during thermal expansion of the fluid caused by severe operating conditions, or when the implement is dragged over an uneven surface. In these situations, one of the female couplers can allow the check valve in an associated male coupler to close, which can cause a block in the system when the flow through the female coupler is desired.

To remedy this problem, some female couplers include a check valve mechanism which allows fluid to flow relatively unimpeded rearwardly to the rear surface of the piston, but which restricts or prevents fluid flow forwardly out of the female coupler. One known check valve mechanism includes a valve ball located within the internal bore of the piston which is spring-biased in both directions to allow fluid to flow rearwardly through the piston at a higher flow rate than forwardly through the piston.

The above couplings have received wide-spread acceptance in the marketplace for providing reliable, serviceable and effective components which operate under a variety of conditions. Some of these couplings direct the fluid internally through the poppet valve to the rear surface of the piston. The flow path includes a radial hole formed in the side of the poppet valve, and a central bore extending axially through the poppet valve. A spring is commonly disposed within the central bore of the poppet valve for biasing the poppet valve against the valve seat. As the spring flexes, the spring can interfere with the flow through the radial hole, which can reduce or even temporarily interrupt the flow through the poppet valve. This can cause an uneven driving force of the piston against the poppet valve, which can be undesirable in certain applications.

Towards providing a direct and uninterrupted flow path to the rear surface of the piston to facilitate moving the poppet valve against the check valve in the male coupler, U.S. Pat. No. 6,016,835 discloses a quick disconnect coupling wherein the female coupler includes a housing adapted to receive a male coupler. The housing includes a valve body slidable within the housing, and a poppet valve internal to the valve body. A piston surrounds the poppet valve to assist in moving the poppet valve against the check valve in the male coupler. Unlike prior female couplers, the flow passage to the rear surface of the piston is provided internally of the piston, rather than the poppet valve, which provides a direct and uninterrupted flow path to the rear surface of the piston to facilitate moving the poppet valve against the check valve in the male coupler. In one design, the flow path extends axially through a tubular main portion of the piston closely surrounding the poppet valve to an internal cavity bounded by an enlarged end portion of the piston, and then to the rear surface of the piston. The flow path can be provided through one or more bores formed axially through the tubular main portion of the poppet valve.

According to second design of quick disconnect coupling disclosed in the '835 patent, a check valve is provided to prevent fluid rapidly flowing from the female coupler during pressure imbalances in the system. The check valve includes an annular wiper seal supported on the rear surface of the piston, and projecting radially inward therefrom. A poppet guide and relief poppet assembly is provided in the rear end of the valve body and extends axially forward internally of the piston and poppet valve. The poppet guide and relief poppet assembly includes a circumferential ridge along an exterior surface thereof. The wiper seal on the piston seals against the annular ridge on the assembly when the pressure drops in the female coupler and the piston moves forwardly within the coupler body. In this position, the wiper seal, also referred to as a trap seal, allows fluid to pass only rearward through the female coupler to the rear surface of the piston, and prevents a vacuum in the female coupler from allowing the male check valve to close. The fluid pressure behind the wiper seal is relieved to ambient only during connect and disconnect to allow the piston to move rearwardly.

In the past, the trap seal sometimes would be "blown out" when a surge of pressurized fluid would pass through the trap seal. This obviously negatively impacts the performance of the coupling and may necessitate repair or replacement of the female coupler.

Other problems have been encountered in female couplers which have an axial end port. Heretofore, a spacer has been used in the housing to provide a flow path for pressurized fluid around the piston and also to isolate the pressurized flow path from a vent port. One end of the spacer is supported by a tubular extension of a housing end plug which is threaded into the end of a cylindrical portion of the housing opposite the flow port. The other end of the sleeve is radially supported in the housing at an annular land including an annular seal which seals against the inner diameter surface of the housing. The annular seal separates high pressure flow from the usually zero pressure in the vent port. The high pressure acting on the seal may cause the seal to be extruded between the spacer and housing.

Still another problem area in prior art female couplers has been contamination of the region containing locking balls that lock the male coupler in the female coupler. Various attempts have been made in the past to prevent sand or other foreign material from entering the locking ball region, but each has had one or more drawbacks associated therewith.

In any case, a constant demand exists in the industry for novel and unique couplings which overcome one or more of the aforesaid problems, and which preferably are reliable, easily serviceable, and operate under a variety of conditions.

SUMMARY OF THE PRESENT INVENTION

The present invention provides improvements in female couplers which overcome one or more of the aforesaid problems encountered with prior art female couplers.

According to one aspect fo the invention, a quick disconnect female coupler comprises a housing and a valve body axially movable in the housing. The valve body has a main cavity and a poppet valve seat at the forward end of the main cavity. A poppet valve is axially movable in the valve body toward and away from the poppet valve seat, and a piston is provided for forwardly urging the poppet valve toward the poppet valve seat upon application of pressurized fluid to the rear side of the piston. A flow passage for supplying pressurized fluid from the main cavity to the back side of the piston has associated therewith a trap seal valve seat and a resilient wiper seal engageable with the trap seal valve seat to block reverse flow of pressurized fluid from behind the piston to the main cavity while permitting flow of pressurized fluid from the main cavity to the rear side of the piston. The wiper seal is retained in a radially opening annular groove and includes at its rear side an annular recess that allows rearward rolling/flaring of the wiper seal in the annular groove when the wiper seal is subjected to a surge of high pressure fluid from the main cavity to the back side of the piston, whereby the wiper seal moves out of the way of the high pressure fluid surge to avoid being forced out of the annular groove.

In a preferred embodiment, the annular recess defines a web joining an annular base portion and an annular sealing portion of the wiper seal, and the wiper seal is radially elongated in cross-section. The annular base portion preferably is larger in cross-section than the annular sealing portion and is retained in the annular groove that preferably is located in a radially inner surface of the poppet valve piston. As will be appreciated, the annular relief preferably functions as a catch for rear side wall of the annular groove when the wiper seal is rotated thereover to aid in holding the wiper seal in the annular groove when a surge of high pressure fluid passes from the main cavity to the back side of the piston.

According to another aspect of the invention, a female coupler comprises a housing having an internal bore with an open forward end adapted to receive a male coupler, and a flow port for supplying pressurized fluid to the internal bore. A tubular spacer is inserted in the housing bore and forms therewith an outer flow passage isolated from an internal bore in the spacer. The spacer has an open forward end and a rear end wall closing the rear end of the spacer. A valve body, which is axially slidable in the spacer bore, includes a main cavity opening to the forward end of the housing bore and a peripheral inlet passage through the valve body communicating the outer flow passage with the main cavity. The valve body and the rear end wall of the spacer define therebetween a vent cavity; and the spacer has an annular land press-fitted in the housing bore and located axially between the outer flow passage and a vent chamber within the housing bore, which vent chamber communicates with the vent cavity via a passage in the spacer. The annular land has an annular groove retaining an annular seal for sealing against the side wall of the housing bore to prevent leakage flow from the outer flow passage to the vent chamber. The press-fitted land protects against extrusion of the seal between the spacer and the housing wall.

In a preferred embodiment, the housing has a rear end wall including a counterbore opening to the housing bore, and the rear end wall of the spacer has an axially rearwardly extending post press-fitted in the counterbore. The annular land and the post preferably are coaxial, and the post may include an annular groove retaining an annular seal for sealing against the housing which may include the flow port in a rear end wall thereof. As will be appreciated, the two-point press-fit securement of the spacer enables elimination of the prior art tubular extension of the end plug that is threaded into the end of the cylindrical portion of the housing opposite the flow port. Consequently the overall length and weight of the female coupler can be reduced if desired.

According to a further aspect of the invention, a female coupler, comprises a housing having an internal bore with an open forward end adapted to receive a male coupler, and a flow port for supplying pressurized fluid to the internal bore. A valve body is disposed in the bore and axially moveable in the housing. The valve body includes a main cavity opening to the forward end of the housing bore, a peripheral inlet passage through the valve body communicating with the main cavity, and an interior valve seat forwardly of the inlet passage. A piston is axially movable in the valve body and includes a central bore in which a poppet valve is slidably guided. The poppet includes a valve portion disposed in the main cavity of the valve body, a forward projection adapted to engage a check valve in the male coupler when the male coupler is received in the housing, and a rearward tubular portion radially stepped to form a annular shoulder portion joining a front wall section to a rear wall section. At least one coil spring is provided to forwardly bias the poppet valve against the valve seat to normally prevent fluid flow through the valve body. A forward portion of the coil spring is radially constrained by a radially inner surface of the front wall section of the rearward portion of the poppet valve, while the rear wall section has a radially inner surface spaced radially outwardly from the coil spring to form interiorly of the poppet valve a flow path for pressurized fluid passing form the main cavity to a back side of the piston. The annular shoulder portion includes one or more orifices for connecting the main cavity to the flow path without any interference of the coil spring.

According to yet another aspect of the invention, a female coupler comprises a housing having an internal bore with an open forward end adapted to receive a male coupler, a flow port for supplying pressurized fluid to the internal bore, and a locking collar chamber at the open forward end. A valve body, which is disposed in the bore and axially moveable in the housing, includes a main cavity opening to the forward end of the housing bore, and a peripheral inlet passage through the valve body communicating with the main cavity, and a tubular front end socket portion including at least one radial bore which retains a locking element for radially inward and outward movement. A locking collar is axially movable in the collar chamber between locking and release positions, the collar in its locking position being operative to hold the locking element at a locking position such that it protrudes radially inwardly of a radially inner surface of the socket portion for engaging a locking groove in the male coupler, and the collar in its release position enabling radial outward movement of the locking element for disengagement from the locking groove in the male coupler. A coil spring circumscribes the locking collar for biasing the locking collar against a stop, and an annular protection shield is interposed between a front end of the coil spring and a retainer at the front end of the locking collar chamber to hold the coil spring in the collar chamber. The protection shield has a radially inner edge adjacent and surrounding the socket portion of the valve body, thereby to prevent debris from entering the locking collar chamber.

Further features and advantages of the present invention will become apparent to those skilled in the art upon reviewing the following specification and attached drawings.

DETAILED DESCRIPTION OF THE PREFERRED EMBODIMENT

Figure 1:
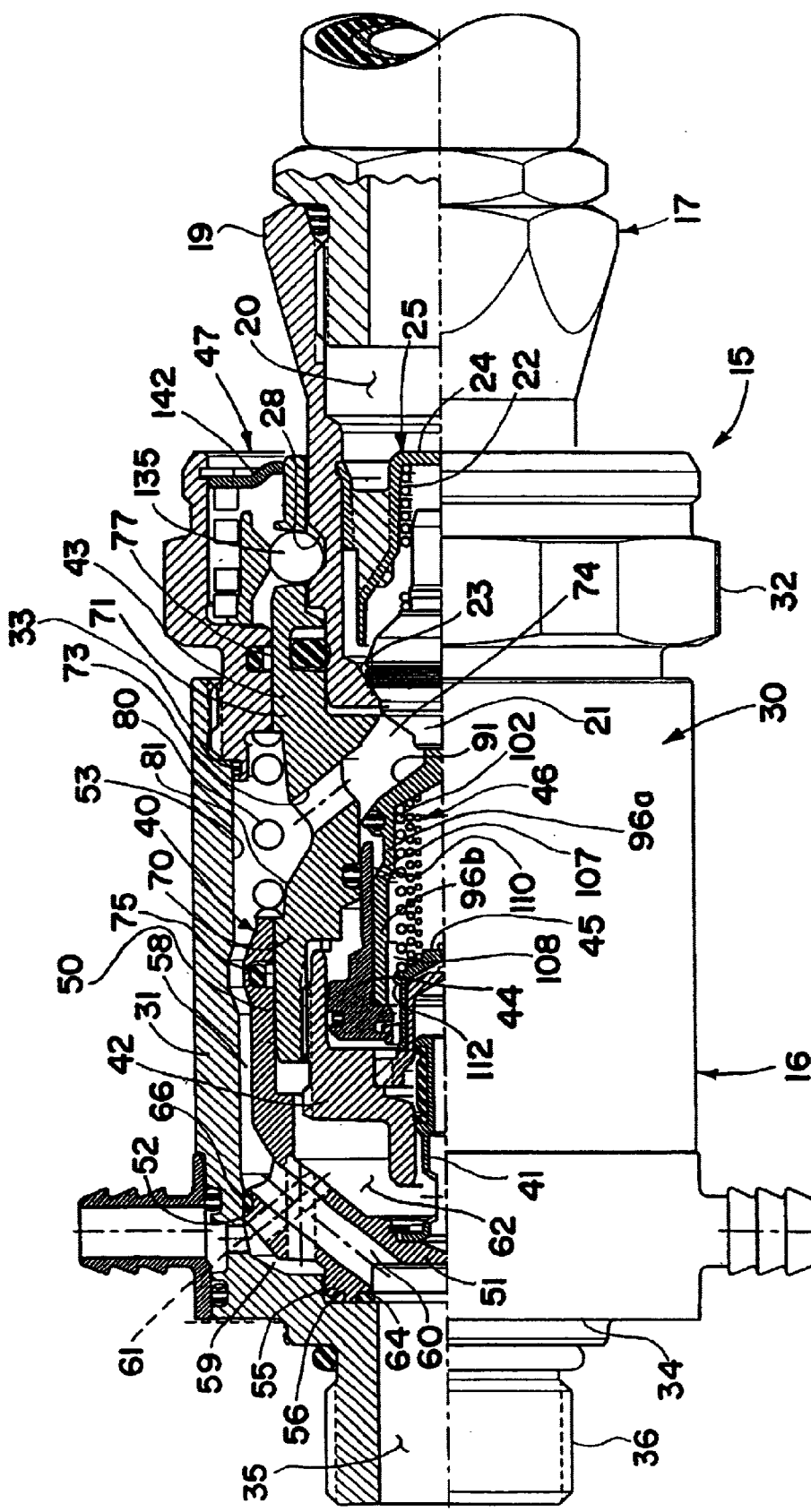
FIG. 1 is a side elevational view, partially in section, of a female coupler according to the present invention, with a male coupler fully inserted and latched in the female coupler, and the male check valve closed.

Referring now in detail to the drawings, and initially to FIG. 1, a quick disconnect coupling of the present invention is indicated generally at 15, and includes a female coupler 16 and a male coupler 17, which are commonly referred to as a socket and nipple, respectively. The quick disconnect coupling was designed for use on agricultural tractors to connect the tractor hydraulic system with attachable implements, and therefore will be chiefly described in this context. However, those skilled in the art will appreciate that the coupling may be used advantageously in other applications.

The male coupler 17, which is typically mounted on an agricultural implement, is a conventional, commercially-available male coupler and includes an outer tubular housing 19 which is also herein referred to as the nipple housing to differentiate it from the housing of the female coupler. The nipple housing has an internal bore 20 and a valve closure or ball 21 that is biased by a spring 22 to a closed position against a valve seat 23 at the forward end of the nipple housing. The spring 22 is retained within a shroud or cup portion 24 of a guide 25. The guide 25 is mounted within the nipple housing by a radially outwardly flared skirt portion thereof that is captured in an annular groove formed in the radially inner surface of the nipple housing. The nipple housing also is provided with an exterior annular groove 28 for receiving the locking balls 30 of the female coupler 16.

The female coupler 16, which is typically mounted on the tractor, includes a housing 30 which for convenience is also referred to herein as the socket housing. In the illustrated embodiment the socket housing 30 is composed of a tubular main portion 31 and a tubular plug end portion 32 threaded into one end of the main portion 31 and sealed thereto by a fitting seal 33. At a rear end wall 34 of the main housing portion 31 opposite the plug 32 there is provided a flow port 35 and a threaded fitting portion 36 for connection of the female coupler to a hydraulic supply hose or other fluid conveyance means on the tractor.

The socket housing 30 houses the internal components of the female coupler 16 which generally comprise, going from left to right in FIG. 1, a spacer 40, a spool guide 41, a spool 42, an axially slidable valve body 43, a piston 44, a relief poppet 45, a poppet assembly 46 and a locking assembly 47. The details, functions and operation of these components are discussed below.

The spacer 40 has a tubular wall portion 50 which is closed by a rear end wall 51 adjacent the flow port 35 and which is open at its opposite or front end. The tubular wall portion 50 has intermediate its ends a radially outwardly protruding annular land 52 which is press-fitted into the interior bore 53 of the socket housing 30 to secure the spacer in the socket housing. The spacer is further secured in the socket housing by a tubular rear end projection or post 55 extending axially from the end wall 51 of the spacer. The post 55 is press-fitted in a counterbore 56 in the end wall 34 of the socket housing 30 coaxially with the socket housing bore 53. Together the land and post secure the spacer in place in the socket housing and further combine to precisely align and hold the spacer in place for proper operation of the coupling. This arrangement obviates the need for an axial extension on the plug fitting 32 previously used in prior art couplers to support and locate the open end of the spacer. The omission of the axial extension in turn enables the overall length of the female coupler to be reduced with a corresponding reduction in material and weight, but without sacrificing performance and durability.

The land 52 on the spacer 40 separates radially reduced portions of the spacer which define with the housing a main flow passage 58 forwardly of the land and a vent flow passage/chamber 59 rearwardly of the land. One or more bores/passages 60 are provided in the spacer to connect the main flow passage 58 to the flow port 35, while one or more other bores/passages 61 are provided in the spacer to connect the vent flow passage/chamber 59 to an interior cavity 62 of the spacer rearwardly of the valve body 43. The rear end post 55 of the spacer 40 has an annular corner groove for retaining an annular seal 64 which seals against leakage from the flow port 35 to the vent chamber 59. The land 52 also has an annular groove for retaining a seal 66 that seals against leakage from the main flow passage 58 to the vent chamber 59. As will be appreciated, the press fit between the land and the interior surface of the housing eliminates any space between the spacer and housing into which the seal 66 might otherwise be extruded due to high pressure fluid in the main flow passage 58. Also, the end of the post 55 is butted up against the end wall 34 of the housing 30 to eliminate any space into which the seal 64 might otherwise be extruded due to high pressure fluid in the flow port 35. However, the interface between the end of the rear end of the post and the bottom wall of the counterbore 56 may be connected to the vent chamber 59 to prevent pressure buildup at such interface if leakage were to occur at the seal 64. The connection may be provided by suitable means, such as by providing one or more flats or axial grooves on the outer diameter surface of the post or on the side wall of the counterbore 56 into which the post is press-fit.

The valve body 43 has a tubular rear end portion 70 that is axially slidable in the spacer 40 and a front tubular portion 71 that is radially supported in the housing plug 32 for axial sliding movement. Between the rear and front end portions, the valve body has passing through an intermediate portion thereof one or more ports 73 for connecting the main flow passage 58 to a main flow cavity 74 within the valve body. A slipper seal 75 or other suitable seal is provided in a groove in the spacer to seal against leakage between the main flow passage 58 and the interior cavity 62 formed at the rear end of the spacer 40, and a slipper seal 77 or other suitable seal is provided in a groove in housing plug to seal against leakage from the main flow passage to the exterior of the female coupler.

The valve body is normally biased to a center position shown in FIG. 1 by a centering spring 80. The centering spring preferably is a coil spring that encircles the valve body 43 and is positioned partway in an annular groove 81 in the outer diameter surface of the valve body. That is, the spring is positioned between oppositely facing shoulder surfaces 82 and 83 (FIG. 2) on the valve body. The spring also is positioned between the forward end face 84 (FIG. 2) of the spacer 40 and a rear end surface 85 (FIG. 2) of the housing plug 32. Preferably, the axial spacing between the shoulder surfaces is equal the axial spacing between the end surfaces of the spacer and housing plug such that the centering spring functions to locate the valve body in the center position shown in FIG. 1 when no fluid pressure or external forces are acting on the valve body.

Figure 2:
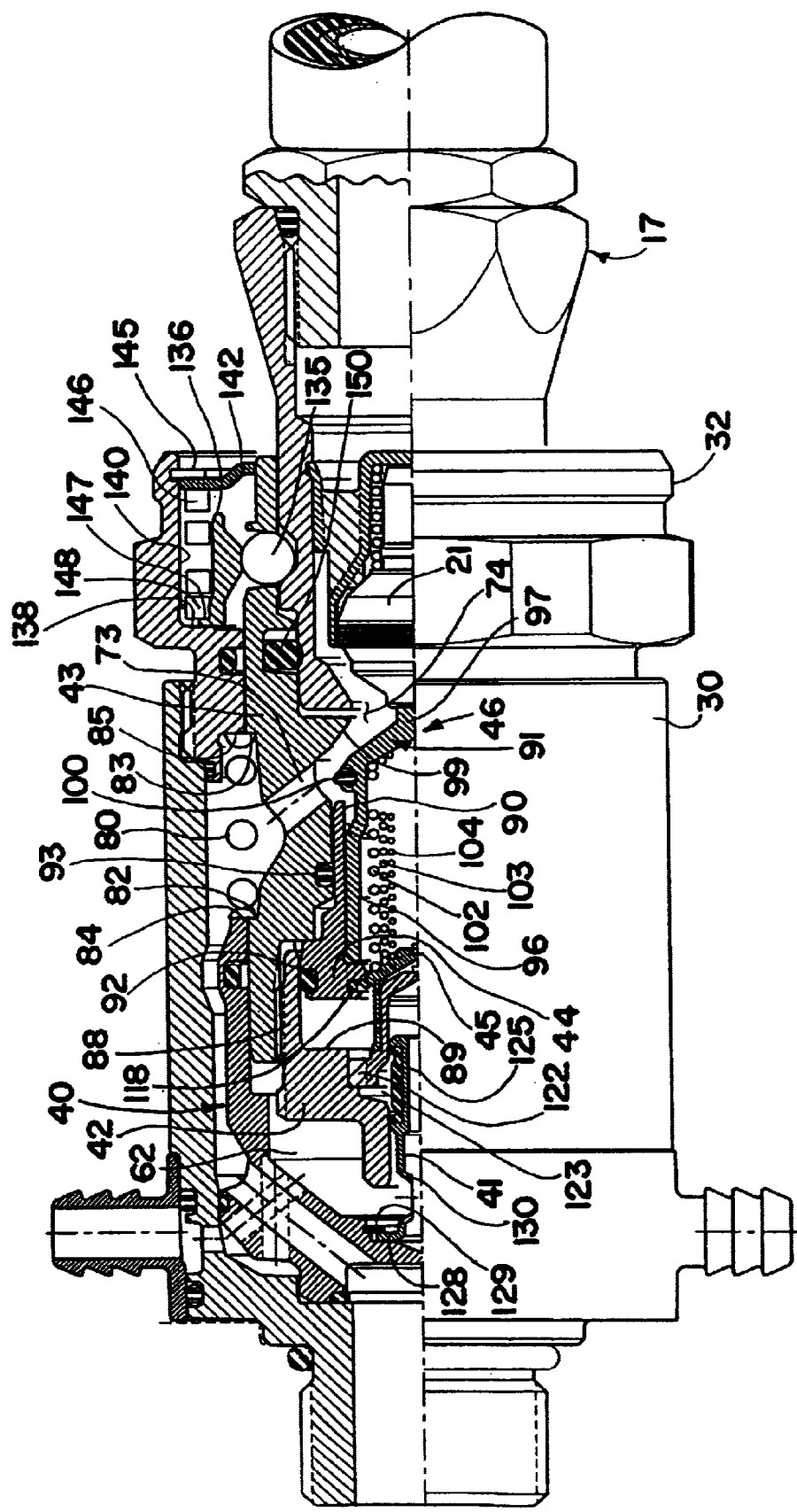
FIG. 2 is a view similar to FIG. 1, but showing the female coupler pressurized and the male check valve open.

With particular reference to FIG. 2, the spool 42 has a tubular front portion 88 threaded into the rear end of the valve body 43 and thus is axially movable with the valve body. The tubular front portion of the spool includes a piston bore 89 for the axially movable piston 44. The piston has a tubular extension 90 which is guided for axial movement in the valve body, and the poppet assembly 46 includes a poppet valve 91 which is guided for axial sliding movement in the tubular extension 90 of the piston. As shown, the piston has an annular groove for a seal 92 that seals against the piston bore 89 and the valve body has an annular groove for a suitable seal 93 that seals against the an outer surface of the extension 90 to close off the rear end of the main cavity 74 at a point rearwardly of the ports 73 in the valve body.

The poppet valve 91 includes a tubular wall 96 that is closely and slidably received within the interior central bore of the piston extension 90, and a front end wall 97 that closes the front end of the poppet valve and which projects forwardly for engaging the check valve ball 21 in the male coupler 17. The front end wall has a radially enlarged, conical outer surface which is engageable with a conical seat 99 on the valve body 43. A seal 100 on the poppet valve provides a seal between the poppet valve and the valve seat 99. A set of concentric coil springs, three such springs 102–104 being shown for example, are located within the poppet valve between the front end wall and a stepped front surface of the relief poppet 45. The springs function to bias the poppet valve toward the valve seat. The springs also function to bias the relief poppet 45 against a stop formed on the spool 42.

Figure 3:
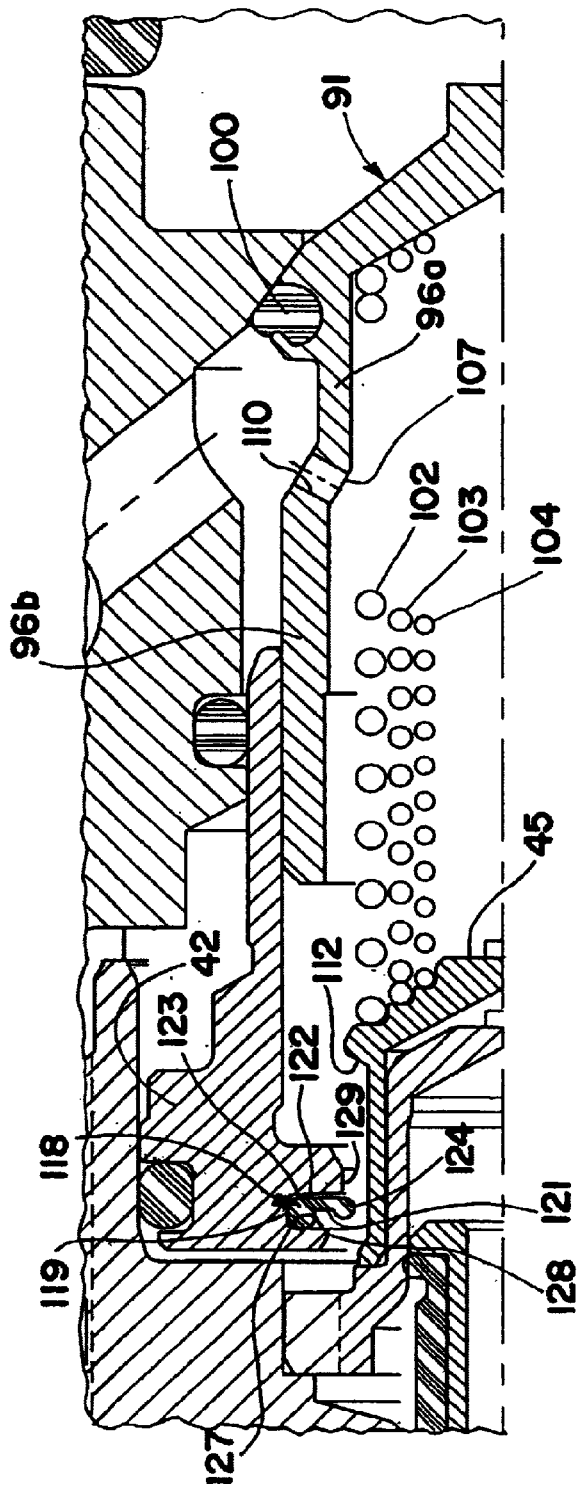
FIG. 3 is an enlarged portion of FIG. 1, showing a trap seal in its normal position.

With reference to FIGS. 1 and 3, the tubular wall 96 of the poppet valve 91 is radially stepped along its axial length by an angled shoulder portion 107. The shoulder portion 107 is located between a smaller diameter front wall portion 96a and a larger diameter rear wall portion 96b. The inner cylindrical surface of the smaller diameter portion 96a radially constrains the front end portion of the larger diameter coil spring 102. The larger rear wall portion 96b is radially outwardly spaced from the larger diameter coil spring 102 to form therebetween an axially extending, cylindrical flow passage 108 between the shoulder portion 107 and relief poppet 45 which is not obstructed by the coil springs 102–104. This flow passage 108 is connected to the main cavity 74 by one or more orifices 110 in the shoulder portion 107 for flow of pressurized fluid from the main cavity 74 into and through the poppet valve 91 and past a trap seal valve seat 112 on the relief poppet 45. Locating the poppet orifices in the shoulder portion avoids the interference with flow caused by the springs in similar prior art couplers. As a further aid to venting flow, the rear wall portion may have the radially inner surface thereof radially outwardly stepped in the region that surrounds the trap seal valve seat 112 on the relief poppet, the trap seal valve seat being formed by a radially outwardly protruding ridge or bead on the relief poppet.

Figure 4:
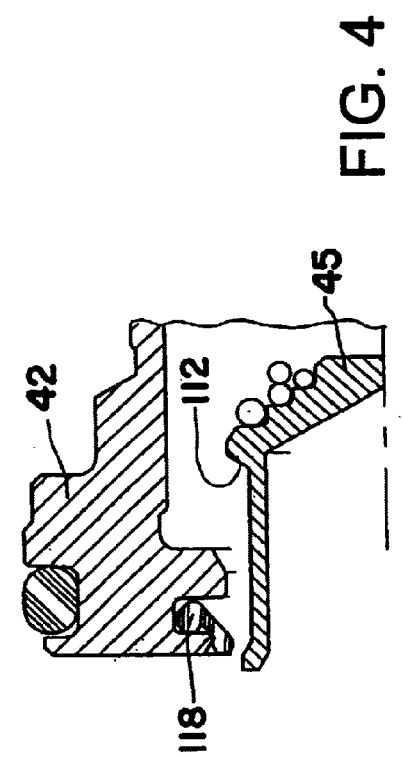
FIG. 4 is a portion of FIG. 3, but showing the trap seal rolled out of the way by a surge of high pressure fluid passing through the inner diameter of the trap seal from right to left in FIG. 4.

As discussed further below, the trap seal valve seat 112 is engageable on its rear side by a trap seal 118 carried in an annular groove 119 formed in the radially inner surface of the piston 42, as is shown in FIG. 3. The trap seal preferably is a unitary elastomeric annular structure that functions as a wiper seal. The trap seal is radially elongated in cross-section and is provided at is rear side with an annular groove 121. The annular groove 121 defines a reduced thickness, radially extending web 122 that connects a radially outer and larger base ring portion 123 to a radially inner and smaller wiper ring portion 124. The outer ring portion 123 is fully retained within the groove 119 which is sized to allow a rolling or flaring movement of the trap seal from its position shown in FIG. 3 to its position shown in FIG. 4. The annular groove 121 at the rear side of the trap seal provides a relief which allows adequate rolling/flaring movement of the trap seal to an out of the way position. In addition, the groove 119 provides for a mechanical interlock between the radially inner side of the outer ring 123 and the rear side wall 127 of the groove which aids in holding the seal in the groove when a surge of high pressure fluid passes from the main cavity to the back side of the piston. If desired, the radially inner edge 128 of the rear side wall of the groove may be offset radially outwardly from the radially inner edge 129 of the front side wall of the groove by at least about the thickness of the web 122 that moves over the rear side wall. Thus, upon a full 90° rotation clockwise in FIGS. 3 and 4, the front surface of the seal will be substantially aligned with or spaced radially outwardly of the inner edge surface 129 of the front side wall of the groove.

As will be appreciated, the inherent resilience of the trap seal 118 will cause the seal to return to its normal un-rolled condition shown in FIG. 3. In addition, it will be appreciated from the following description that pressure fluid on the rear side of the piston may also assist and/or cause the seal to roll back to its FIG. 3 position.

Reverting to FIG. 2, the piston bore 82 forwardly of the piston 42 is vented to the vent cavity 62 behind the spool 42 via one or more passages (not shown) between or in the spool and/or valve body, for example by providing one or more axial grooves in the threads securing the spool to the valve body. The piston bore to the rear of the piston is connected via one or more passages 122 in the spool to an interior spool chamber 123 which is controllably connected to the vent cavity 62 by axial movement of the spool relative to a cylindrical spool seal 125. The spool seal 125 is retained in an annular groove on a tubular spool guide 41 which is fixed at an end flange 128 to the spacer end wall by a retaining clip 129. The spool seal has radially outwardly protruding sealing portions which are axially spaced apart such that they can seal against the inner diameter surface of the spool on opposite sides of the spool chamber 123. Axial movement of the spool relative to the spool seal in either direction will connect the spool chamber 123 to the vent cavity 62. The tubular guide 41 includes one or more passages 130 to connect the interior thereof to the vent cavity for venting when the spool moves rearwardly relative to the spool seal, as occurs during insertion of the male coupler 17 into the female coupler 16 prior to engagement of the locking assembly 47.

Still referring to FIG. 2, the locking assembly 47 includes one or more locking balls 135 in the forward end of the valve body 43. The locking balls are retained by a collar 136 which surrounds the locking balls and which can slide axially between a radially-extending shoulder 138 at the bottom of a locking collar chamber 140 in the female housing and a protection shield 142 which functions as a stop. The protection shield is captured between a retaining ring 145 in an annular groove in the socket housing 30 and the front end of a coil spring 146 that circumscribes the collar. The other end of the coil spring engages a shoulder flange 147 on the collar via a washer 148. Accordingly, the coil spring biases the collar rearwardly (to the left in FIG. 2). A nipple seal 150 is positioned in an annular groove on the inside of the valve body and is engageable with the male housing 19 when the male coupler 17 is inserted into the female coupler 16.

In accordance with the invention, the protection shield 142 not only functions as a stop for the collar 136, but it also functions as a seal or shield to prevent dirt and other contaminants from entering into the collar chamber 140 and fouling operation of the locking mechanism. To this end, the shield preferably spans the annular gap between the valve body and the socket housing at the front end of the socket housing. The seal may be made of a stiff material, or of a resilient and/or elastomeric material that may wipingly engage the outer surface of the axially shiftable valve body, if desired.

The operation of the quick disconnect coupling will now be described. FIG. 1 shows the male coupler 17 after it has been fully inserted into the female coupler 16 and with the female coupler at zero pressure, i.e., fully vented, and the male coupler pressurized. As shown, the poppet valve 91 has been moved away from the valve seat 99 (FIG. 2) by the projecting end of the ball 21 of the male coupler 17. Also, the locking balls 135 are held engaged in the locking groove 28 in the nipple housing 19 of the male coupler by the locking collar 136.

In the context of a coupling for connecting a tractor to an attachable tractor implement, the tractor operator may pressurize the flow port 35 and the main cavity 74 of the valve body 43 by operating a control valve on the tractor. High pressure within the main cavity 74 forces the ball 21 of the male coupler away from its seat 23 and opens the male coupler to the tractor hydraulic pressure. At the same time, high pressure fluid will be communicated with the rear side of the piston 44 via the poppet orifices 110 (FIG. 3) and past the check valve formed by the trap seal 118 and seat 112. This may occur in some instances with a surge of high pressure fluid passing through the trap seal. In accordance with the invention, the trap seal will be caused by such flow to roll/flare to an out of the way position thereby preventing it from being "blown out" of its retaining groove 119.

High pressure fluid acting on the rear side of the piston 42 will cause the piston to shift to the right and against a shoulder surface in the valve body 43. In this position shown in FIG. 2, the piston operates to hold the poppet valve 91 at a position which will prevent the ball 21 of the male coupler 17 from closing against the valve seat 23 in the male coupler, should a situation arise where the forces acting on the ball of the male coupler are insufficient to hold it open.

When the piston 44 has been shifted forwardly as shown in FIG. 2, the trap seal 118 will seal against the trap seal valve seat 112 to retain pressurized fluid at the rear side of the piston when pressure in the main cavity 74 drops below that necessary to maintain the piston in a position that keeps open the ball of the male coupler. That is, the trap seal prevents back flow of pressurized fluid from the piston chamber to the main cavity 74, i.e., it traps pressurized fluid behind the piston, while allowing fluid flow rearward through the coupling. In essence, the trap seal functions as a wiper seal that operates as a simple one-way check valve when in engagement with valve seat on the relief poppet. As a result, a loss of pressure in the valve body cavity will not result in closure of the ball of the male coupler.

If the trapped pressure in the male coupler 17 exceeds the tractor pressure applied at port 35, the piston 44 will still force open the ball 21 of the male coupler since the diameter of the piston is greater than the diameter of the ball. As a result, the ball can be forced open even if the pressure within the female coupler is less than the trapped pressure within the male coupler.

During use the pressure of fluid passing through the coupling will fluctuate, typically from a high value when tractor pressure is being supplied for example to extend a hydraulic actuator to a lower pressure such as when the hydraulic actuator is connected to return for retraction. To alleviate unneeded/excess pressure behind the piston 44 under low or atmospheric pressure in the hydraulic line, in a known manner the relief poppet 45 will be caused to be unseated from the trap seal by a pressure difference thereacross to allow pressure to bleed back into the main cavity.

When the couplers are to be disconnected, the control valve to the flow port 35 is closed, and a pull force is applied to the male coupler 17 which will shift the male coupler and the slidable internal components of the female coupler 16 to the right from the FIG. 2 position. The locking collar 136 remains in locking engagement with the locking balls 135. As the locking collar moves to the right with the male coupler, the spring 146 is compressed. The movement to the right of the valve body 43 and the spool is sufficient to open the seal between the spool 42 and the spool seal 125. The pressure within spool chamber 123 and that acting on the rear side of the piston 44 will be dumped to atmospheric pressure and the ball 21 of the male coupler 17 will close by virtue of the trapped pressure within the male coupler and/or by the action of the return spring 22.

As the valve body 43 is further moved forwardly, the locking balls 135 will align with the front ramp surface on the collar 136 and thus will be free to move radially outwardly to release the male coupler 17. As the male coupler is pulled away from the female coupler, the poppet valve 91 will be allowed to return to its closed position engaging the poppet valve seat 99. Also, the spring force acting on the locking collar 136 will cause the balls to move radially inwardly and the locking collar to return to its normal position. Finally, the centering spring 80 will cause the valve body to return to its centered position shown in FIG. 1, whereupon the spool valve 125 will once again block communication between the back side of the piston and the vent cavity 62.

To couple the couplers, the male coupler 17 is inserted into the female coupler 16. As the male coupler is being inserted, the nipple housing 19 will engage the nipple seal 150 in the valve body 43 and the nipple housing will engage the balls 135. The balls will initially be precluded from moving radially outwardly because of the collar 136, and consequently the valve body 43 will be caused to be shifted rearwardly in the socket housing 30. In addition, if the male coupler is pressurized the ball 21 of the male coupler will engage the poppet valve 91 and move it rearwardly away from the poppet valve seat 99. In addition, the spool 42 will be shifted rearwardly to release any pressurized fluid behind the piston 44 so that the poppet valve can be opened. Also, the locking balls 135 will align with the rear ramp surface of the locking collar 136 whereupon they will be forced radially outwardly with the retaining collar being cammed forwardly against the biasing force of the collar spring 146. As the male coupler reaches its fully inserted position, the locking balls will align with the locking groove 28 in the male coupler, whereupon the collar will cam the locking balls radially inwardly into the locking groove and then move to hold the locking balls in the locking groove. Also, the centering spring 80 will shift the valve body 43 back to its position shown in FIG. 1, whereupon the female and male couplers will be ready for application of pressure in the above-described manner.

As described above, the present invention provides a novel and unique quick disconnect coupling which is particularly useful for hydraulic and pneumatic fluid lines. The disconnect coupling is reliable, serviceable and operates under a variety of conditions.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A quick disconnect female coupler comprising:

a housing;

a valve body axially movable in the housing, the valve body having a main cavity and a poppet valve seat at the forward end of the main cavity;

a poppet valve axially movable in the valve body toward and away from the poppet valve seat;

a piston for forwardly urging the poppet valve toward the poppet valve seat upon application of pressurized fluid to the rear side of the piston;

a flow passage for supplying pressurized fluid from the main cavity to the back side of the piston;

a trap seal valve seat; and a resilient wiper seal engageable with the trap seal valve seat to block reverse flow of pressurized fluid from behind the piston to the main cavity while permitting flow of pressurized fluid from the main cavity to the rear side of the piston, the wiper seal being retained in a radially opening annular groove and including at its rear side an annular recess that allows rearward rolling of the wiper seal in the annular groove when the wiper seal is subjected to a surge of high pressure fluid from the main cavity to the back side of the piston, whereby the wiper seal moves out of the way of the high pressure fluid surge to avoid being forced out of the annular groove.

2. A female coupler as set forth in claim 1, wherein the annular recess defines a web joining an annular base portion and an annular sealing portion of the wiper seal.

3. A female coupler as set forth in claim 2, wherein the wiper seal is radially elongated in cross-section.

4. A female coupler as set forth in claim 3, wherein the annular base portion is larger in cross-section than the annular sealing portion.

5. A female coupler as set forth in claim 4, wherein the piston includes at an inner diameter surface thereof the annular groove in which the wiper seal is retained.

6. A female coupler as set forth in claim 2, wherein the annular relief functions as a catch for rear side wall of the annular groove when the wiper seal is rotated thereby to aid in holding the wiper seal in the annular groove when a surge of high pressure fluid passes from the main cavity to the back side of the piston.

7. A female coupler as set forth in claim 6, wherein the radially inner edge of the rear side wall of the annular groove is offset from the radially inner edge of the front side wall of the annular groove by at least about the thickness of the web.

8. A female coupler as set forth in claim 1, wherein the wiper seal is radially elongated in cross-section.

9. A female coupler as set forth in claim 1, wherein the annular relief functions as a catch for rear side wall of the annular groove when the wiper seal is rotated thereby to aid in holding the wiper seal in the annular groove when a surge of high pressure fluid passes from the main cavity to the back side of the piston.

10. A female coupler, comprising:

a housing having an internal bore with an open forward end adapted to receive a male coupler, and a flow port for supplying pressurized fluid to the internal bore;

a tubular spacer inserted in the housing bore and forming therewith an outer flow passage isolated from an internal bore in the spacer, the spacer having an open forward end and a rear end wall closing the rear end of the spacer;

a valve body axially slidable in the spacer bore, the valve body including a main cavity opening to the forward end of the housing bore and a peripheral inlet passage through the valve body communicating the outer flow passage with the main cavity, the valve body and the rear end wall of the spacer defining therebetween a vent cavity; and wherein the spacer has an annular land press-fitted in the housing bore and located axially between the outer flow passage and a vent chamber within the housing bore, which vent chamber communicates with the vent cavity via a passage in the spacer, and the annular land has an annular groove retaining an annular seal for sealing against the side wall of the housing bore to prevent leakage flow from the outer flow passage to the vent chamber.

11. A female coupler as set forth in claim 10, wherein the housing has a rear end wall including a counterbore opening to the housing bore, and the rear end wall of the spacer has an axially rearwardly extending post press-fitted in the counterbore.

12. A female coupler as set forth in claim 11, wherein the annular land and the post are coaxial.

13. A female coupler as set forth in claim 11, wherein the post includes an annular groove retaining an annular seal for sealing against the housing.

14. A female coupler as set forth in claim 13, wherein the rear end wall of the housing includes the flow port, the flow port is circumscribed by the annular seal retained in the annular groove in the post, and the rear wall of the spacer includes a passage communicating the flow port with the outer flow passage.

15. A female coupler as set forth in claim 14, wherein the interface between an axial end face of the post and the bottom of the counterbore is vented to the vent chamber.

16. A female coupler as set forth in claim 10, further comprising a centering spring retained in an annular recess in the radially outer surface of the valve body, and further between a shoulder at the front end of the housing and a front end face of the spacer.

17. A female coupler as set forth in claim 15, wherein the housing includes a tubular rear end portion and a tubular front end portion screwed into the rear end portion, and the front end housing portion includes the shoulder.

18. A female coupler as set forth in claim 10, wherein the housing includes a tubular rear end portion and a tubular front end portion screwed into the rear end portion, and the front end portion is axially spaced apart from the spacer.

19. A female coupler, comprising:

a housing having an internal bore with an open forward end adapted to receive a male coupler, and a flow port for supplying pressurized fluid to the internal bore;

a valve body disposed in the bore and axially moveable in the housing, the valve body including a main cavity opening to the forward end of the housing bore, a peripheral inlet passage through the valve body communicating with the main cavity, and an interior valve seat forwardly of the inlet passage;

a piston axially movable in the valve body and including a central bore;

a poppet valve slidably guided in the central bore of the piston, the poppet including a valve portion disposed in the main cavity of the valve body, a forward projection adapted to engage a check valve in the male coupler when the male coupler is received in the housing, and a rearward tubular portion radially stepped to form a annular shoulder portion joining a front wall section to a rear wall section; and at least one coil spring for forwardly biasing the poppet valve against the valve seat to normally prevent fluid flow through the valve body, a forward portion of the coil spring being radially constrained by a radially inner surface of the front wall section of the rearward portion of the poppet valve, the rear wall section having a radially inner surface spaced radially outwardly from the coil spring to form interiorly of the poppet valve a flow path for pressurized fluid passing form the main cavity to a back side of the piston, and the annular shoulder portion including one or more orifices for connecting the main cavity to the flow path without any interference of the coil spring.

20. A female coupler as set forth in claim 18, wherein the annular shoulder portion is sloped relative to the axis of the poppet valve.

21. A female coupler comprising:

a housing having an internal bore with an open forward end adapted to receive a male coupler, a flow port for supplying pressurized fluid to the internal bore, and a locking collar chamber at the open forward end;

a valve body disposed in the bore and axially moveable in the housing, the valve body including a main cavity opening to the forward end of the housing bore, and a peripheral inlet passage through the valve body communicating with the main cavity, and a tubular front end socket portion including at least one radial bore which retains a locking element for radially inward and outward movement;

a locking collar axially movable in the collar chamber between locking and release positions, the collar in its locking position being operative to hold the locking element at a locking position such that it protrudes radially inwardly of a radially inner surface of the socket portion for engaging a locking groove in the male coupler, and the collar in its release position enabling radial outward movement of the locking element for disengagement from the locking groove in the male coupler;

a coil spring circumscribing the locking collar for biasing the locking collar against a stop;

a retainer at the front end of the locking collar chamber; and an annular protection shield interposed between a front end of the coil spring and the retainer to hold the coil spring in the collar chamber, and the protection shield having a radially inner edge adjacent and surrounding the socket portion of the valve body, thereby to prevent debris from entering the locking collar chamber.

* * * * *